(12) United States Patent
Ray et al.

(10) Patent No.: US 9,807,664 B1
(45) Date of Patent: Oct. 31, 2017

(54) WIRELESS COMMUNICATION SYSTEM TO OPTIMIZE DEVICE PERFORMANCE ACROSS WIRELESS COMMUNICATION NETWORKS

(71) Applicant: Sprint Communications Company L.P., Overland Park, KS (US)

(72) Inventors: Amar Nath Ray, Shawnee, KS (US); James Patrick Sisul, Overland Park, KS (US); Tracy Lee Nelson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 169 days.

(21) Appl. No.: 14/297,956

(22) Filed: Jun. 6, 2014

(51) Int. Cl.
*H04W 36/30* (2009.01)
*H04W 24/02* (2009.01)

(52) U.S. Cl.
CPC ........... *H04W 36/30* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 8,145,210 B2 | 3/2012 | Thalanany et al. | |
| 8,289,861 B2 | 10/2012 | Zafer et al. | |
| 8,537,783 B2 | 9/2013 | Matsumoto | |
| 2007/0115887 A1 | 5/2007 | Baek et al. | |
| 2007/0281688 A1* | 12/2007 | Tajima | H04W 36/18 455/433 |
| 2008/0113683 A1* | 5/2008 | Paas | H04M 1/72519 455/552.1 |
| 2010/0142487 A1* | 6/2010 | Kim | H04W 24/10 370/332 |
| 2011/0306333 A1 | 12/2011 | Yee et al. | |
| 2011/0310737 A1* | 12/2011 | Klingenbrunn | H04W 36/0044 370/235 |
| 2012/0207086 A1 | 8/2012 | Vihtari et al. | |

(Continued)

*Primary Examiner* — Faruk Hamza
*Assistant Examiner* — Cassandra Decker

(57) ABSTRACT

A wireless communication system to optimize device performance across wireless communication networks. A wireless communication device communicates over a first wireless communication network. The first wireless communication network determines first performance metrics. Communication is transferred to a second wireless communication network. The second wireless communication network determines second performance metrics. A control processing system compares the first performance metrics with the second performance metrics to determine configuration instructions for the second wireless communication network, and transfers the configuration instructions to the second wireless communication network. The second wireless communication network modifies a network configuration based on the configuration instructions and determines third performance metrics. The control processing system compares the first performance metrics with the third performance metrics to determine a user notice related to session quality on the second wireless communication network. The control processing system transfers the user notice to the wireless communication device.

20 Claims, 7 Drawing Sheets

(56) References Cited

U.S. PATENT DOCUMENTS

| | | |
|---|---|---|
| 2012/0210006 A1 | 8/2012 | Vihtari |
| 2014/0293789 A1* | 10/2014 | Machida ............... H04L 45/121 |
| | | 370/235 |
| 2014/0362830 A1* | 12/2014 | Verger .............. H04W 36/0072 |
| | | 370/332 |
| 2015/0131619 A1* | 5/2015 | Zhu ................... H04W 36/0022 |
| | | 370/332 |
| 2015/0163811 A1* | 6/2015 | Konstantinou .......... H04N 1/00 |
| | | 370/329 |

* cited by examiner

WIRELESS COMMUNICATION SYSTEM TO OPTIMIZE DEVICE PERFORMANCE ACROSS WIRELESS COMMUNICATION NETWORKS

TECHNICAL BACKGROUND

Wireless communication devices communicate with wireless communication networks using wireless protocols, such as Long Term Evolution (LTE), Evolution Data Optimized (EVDO), Code Division Multiple Access (CDMA), Global System for Mobile communications (GSM), High Speed Packet Access (HSPA), and the like. Wireless communication devices, such as cellular phones are mobile and may be moved throughout a geographic area. As mobile devices change location, it may be necessary to handoff to another wireless access point or to another wireless communication network.

Depending on the wireless communication networks available in a geographic location, mobile devices may handoff between different wireless protocols (i.e. LTE to 3G) or to different wireless carriers. It is desirable to maintain a user's Quality of Service (QoS) across wireless communication networks.

Overview

A wireless communication system to optimize device performance across wireless communication networks. A wireless communication device communicates over a first wireless communication network. The first wireless communication network determines first performance metrics for the first wireless communication network. Communication is transferred to a second wireless communication network. The second wireless communication network determines second performance metrics for the second wireless communication network. A control processing system compares the first performance metrics with the second performance metrics to determine configuration instructions for the second wireless communication network. The control processing system transfers the configuration instructions for delivery to the second wireless communication network. The second wireless communication network modifies a network configuration based on the configuration instructions and determines third performance metrics for the second wireless communication network. The control processing system compares the first performance metrics with the third performance metrics to determine a user notice related to session quality on the second wireless communication network. The control processing system transfers the user notice for delivery to the wireless communication device.

DETAILED DESCRIPTION

Figure 1:
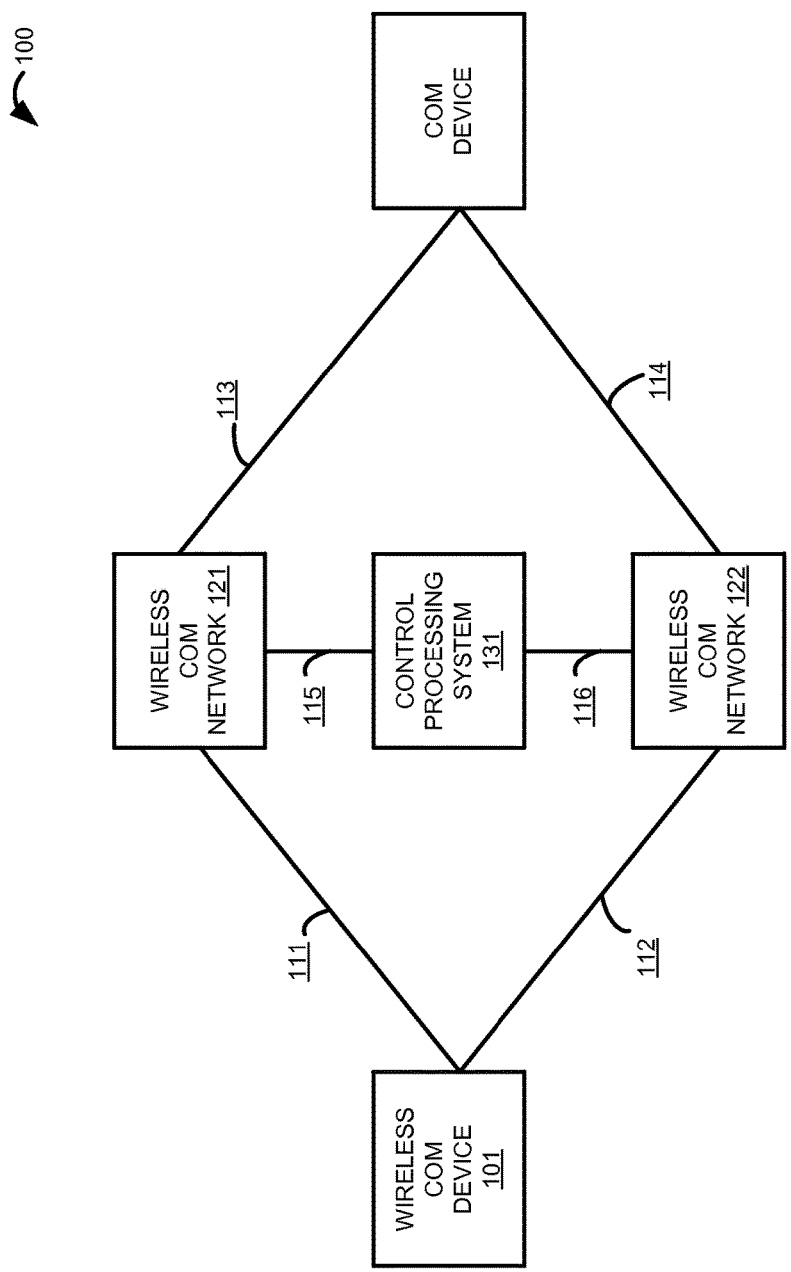
FIG. 1 illustrates a wireless communication system to optimize device performance across wireless communication networks.

FIG. 1 illustrates wireless communication system 100. Wireless communication system 100 includes wireless communication device 101, wireless communication network 121, wireless communication network 122, and control processing system 131. Although shown separate from wireless communication networks 121 and 122, control processing system 131 could be located within wireless communication network 121, wireless communication network 122, or across both.

Wireless communication device 101 communicates with wireless communication network 121 over wireless link 111. Wireless communication device 101 communicates with wireless communication network 122 over wireless link 112. Control processing system 131 communicates with wireless communication network 121 over communication link 115. Control processing system 131 communicates with wireless communication network 122 over communication link 116.

Examples of wireless communication device 101 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof.

Examples of wireless communication network 121 and wireless communication network 122 include a Long Term Evolution (LTE) network, Evolution Data Optimized (EVDO) network, Code Division Multiple Access (CDMA) network, Global System for Mobile communications (GSM) network, High Speed Packet Access (HSPA) network, High Rate Packet Data (HRPD) network, Wireless Fidelity (WIFI) network, Worldwide Interoperability for Microwave Access (WiMAX), and the like. Examples of control processing system 131 include the IP Multimedia System (IMS), Mobility Management Entity (MME), PDN Gateway (P-GW), and evolved Packet Data Gateway (ePDG). Examples of performance metrics include packet loss, delay, jitter, RSS, Signal to Noise Ratio (SNR), interference, Quality of Service (QoS), QoS Class of Identifier (QCI), vulnerability to Denial of Service (DoS) or Distributed DoS (DDoS) attack, Stateful or Deep Packet Inspection (SPI/DPI) availability, alarm availability, encryption availability, or other performance metrics—including combinations thereof.

In operation, wireless communication network 121 exchanges first wireless communications with wireless communication device 101 for a communication session. In some examples, the communication session comprises a Voice over LTE (VoLTE) communication session. In other examples, the communication session could comprise a voice communication session, video communication session, media session, data session, or other communication session—including combinations thereof. Wireless communication network 121 determines first performance metrics for the communication session on wireless communication network 121. The communication session is transferred to wireless communication network 122. For example, wireless communication network 122 may use a different wireless protocol. For instance, wireless communication network 121 may be an LTE network, and wireless communication network 122 may be a WIFI, HSPA, HRPD, or some other wireless communication network—including combinations thereof. In other examples, wireless communication network 121 and wireless communication network 122 may be operated by different network operators.

After the communication session transfer, wireless communication network 122 exchanges second wireless communications with wireless communication device 101 for the communication session. Wireless communication network 122 determines second performance metrics for the communication session on wireless communication network 122. The level of service for the communication session may vary after the communication session is transferred to wireless communication network 122. For example, the communication session may experience more delay/latency or jitter on wireless communication network 122. A user's QoS may require minimum levels of bandwidth, delay, jitter, and/or other requirements—including combinations thereof. Control processing system 131 compares the first performance metrics with the second performance metrics to determine configuration instructions for wireless communication network 122. Control processing system 131 transfers the configuration instructions for delivery to wireless communication network 122. Wireless communication network 122 receives the configuration instructions and responsively modifies a network configuration. For example, wireless communication network 122 may explicitly reserve resources to service the communication session. In other examples, the wireless communications may be marked as priority communications. In yet other examples, the wireless communications may include error correction.

Wireless communication network 122 exchanges third wireless communications with wireless communication device 101 for the communication session and determines third performance metrics for the communication session on wireless communication network 122. Control processing system 131 compares the first performance metrics with the third performance metrics to determine a user notice related to session quality on wireless communication network 122. Control processing system 131 transfers the user notice for delivery to wireless communication device 101. For instance, the user notice may be a pop-up alert, banner alert, text message, email, or other notice—including combinations thereof.

Figure 2:
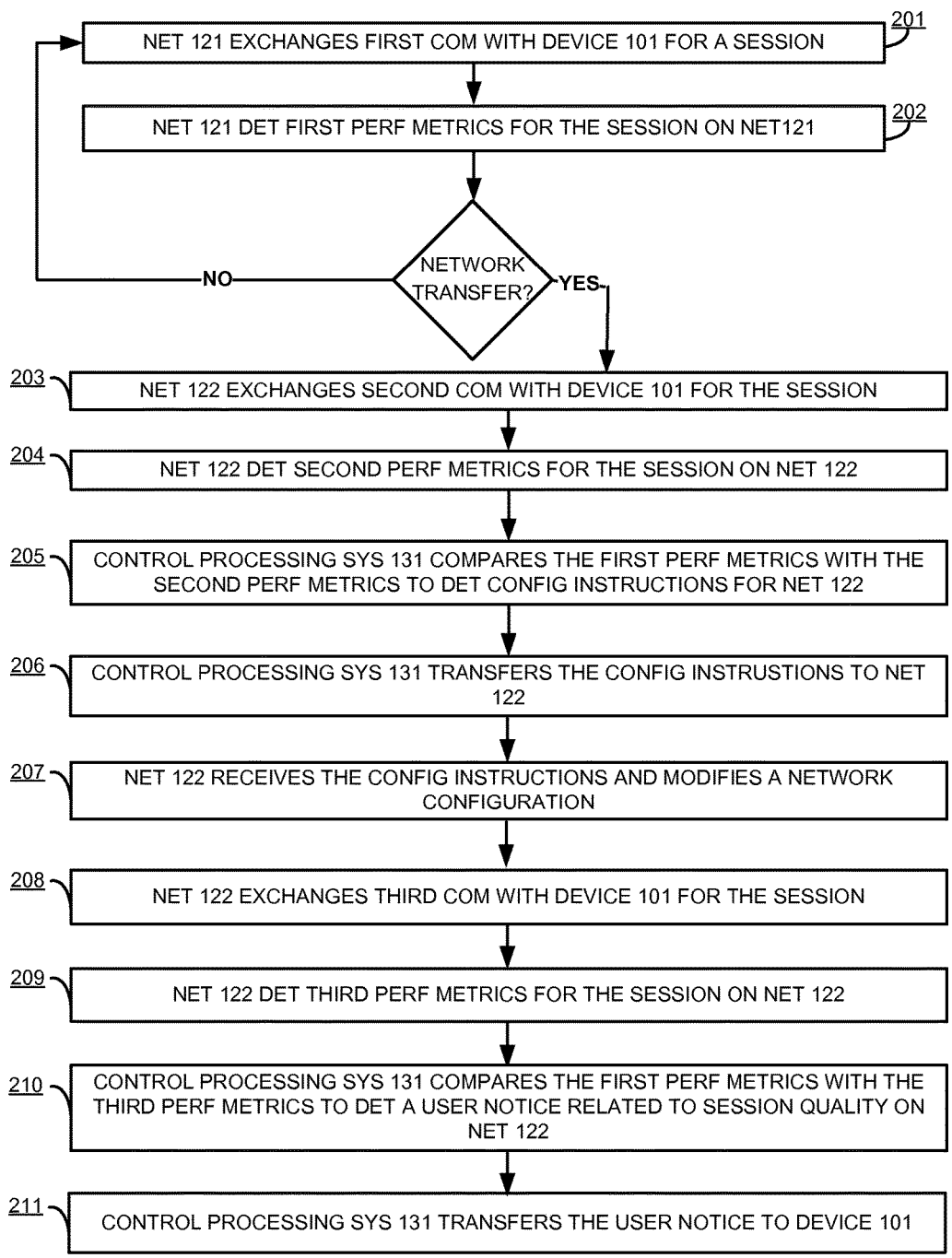
FIG. 2 illustrates the operation of the wireless communication system to optimize device performance across wireless communication networks.

FIG. 2 illustrates the operation of wireless communication system 100. In operation, wireless communication network 121 ("net 121") exchanges first wireless communications ("first com") with wireless communication device 101 for a communication session (201). Wireless communication network 121 determines first performance metrics ("first perf metrics") for the communication session on wireless communication network 121 (202).

The communication session is transferred to wireless communication network 122 ("net 122"). In some examples, the network transfer caused when wireless communication device 101 moves out of the coverage area of wireless communication network 121. In other examples, wireless communication network 121 becomes heavily loaded and transfers wireless communication device 101 to wireless communication network 122.

After the communication session transfer, wireless communication network 122 exchanges second wireless communications ("second com") with wireless communication device 101 for the communication session (203). Wireless communication network 122 determines second performance metrics ("second perf metrics") for the communication session on wireless communication network 122 (204).

Control processing system 131 compares the first performance metrics with the second performance metrics to determine configuration instructions ("config instructions") for wireless communication network 122 (205). Control processing system 131 transfers the configuration instructions for delivery to wireless communication network 122 (206). Wireless communication network 122 receives the configuration instructions and responsively modifies a network configuration (207). In some examples, wireless communication network 122 will adjust network bandwidth (i.e. peak use or total guarantee) for wireless communication device 101.

Although not required, control processing system 131 may store information about network performance. Configuration instructions may be determined based on historical network performance. In other examples, wireless communication device 101 may store network transfer and configuration information and transfer network configuration information when transferring between networks.

Wireless communication network 122 exchanges third wireless communications ("third com") with wireless communication device 101 for the communication session (208). Wireless communication network 122 determines third performance metrics ("third perf metrics") for the communication session on wireless communication network 121 (209). Control processing system 131 compares the first performance metrics with the third performance metrics to determine a user notice related to session quality on wireless communication network 122 (210). Control processing system 131 transfers the user notice for delivery to wireless communication device 101 (211).

Wireless communication device 101 may display the user notice to the user. The user notice may indicate the comparative quality for the communication session between wireless communication network 121 and wireless communication network 122. Examples of comparative quality include comparable, higher/better, lower/worse, lower (but adequate), etc.

Figure 3:
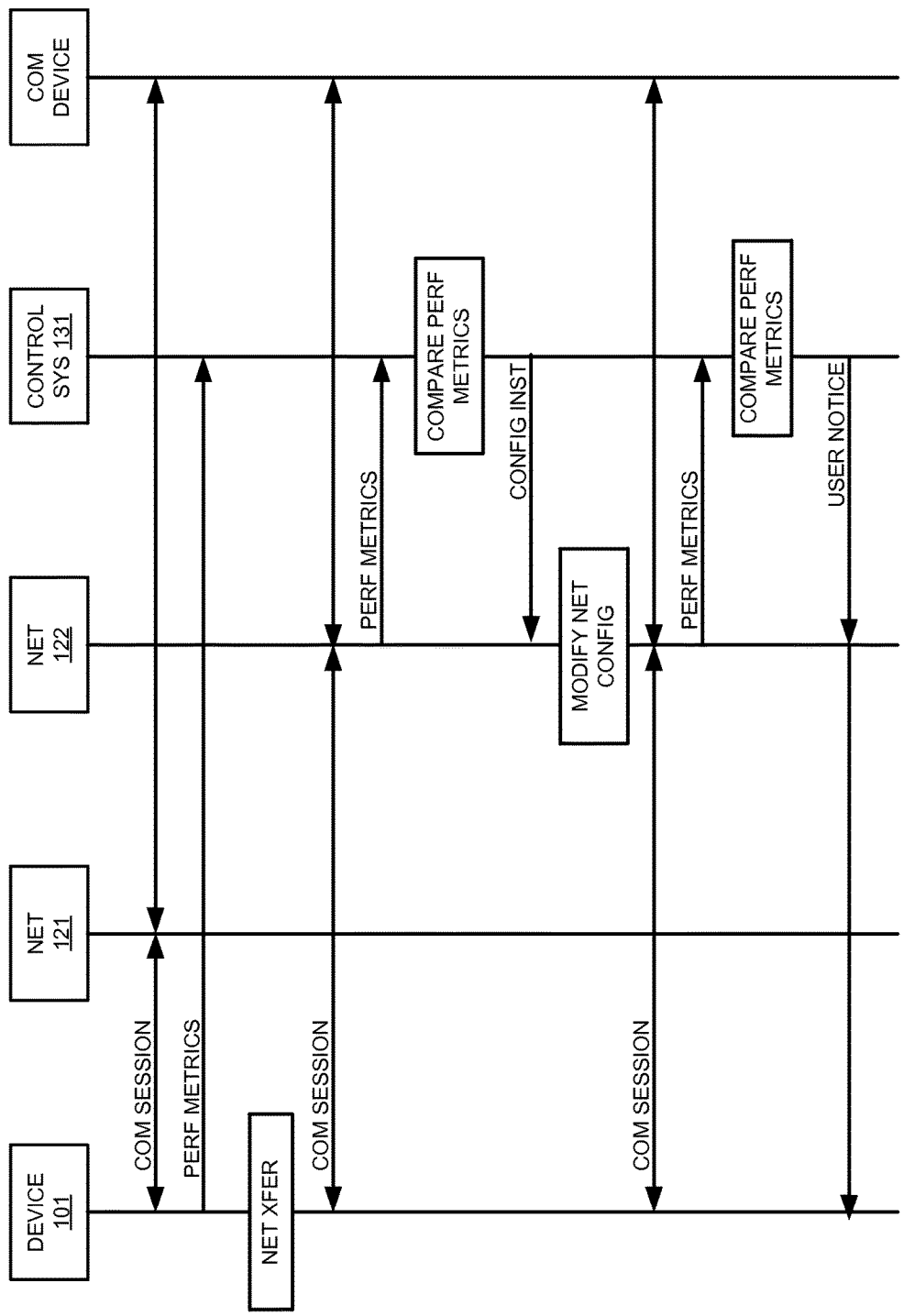
FIG. 3 illustrates the operation of the wireless communication system to optimize device performance across wireless communication networks.

FIG. 3 illustrates the operation of wireless communication system 100 to optimize device performance across wireless communication networks 121 and 122. In operation, wireless communication network 121 exchanges first wireless communications with wireless communication device 101 for a communication session. Wireless communication network 121 determines first performance metrics for the communication session on wireless communication network 121. Wireless communication network 121 transfers the first performance metrics for delivery to control processing system 131. The communication session is transferred to wireless communication network 122.

After communication session transfer, wireless communication network 122 exchanges second wireless communications with wireless communication device 101 for the communication session. Wireless communication network 122 determines second performance metrics for the communication session on wireless communication network 122. Wireless communication network 122 transfers the second performance metrics for delivery to control processing system 131.

Control processing system 131 compares the first performance metrics with the second performance metrics to determine configuration instructions for wireless communication network 122. Control processing system 131 transfers the configuration instructions for delivery to wireless communication network 122. Wireless communication network 122 receives the configuration instructions and responsively modifies a network configuration.

Wireless communication network 122 exchanges third wireless communications with wireless communication device 101 for the communication session and determines third performance metrics for the communication session on wireless communication network 122. Wireless communication network 122 transfers the third performance metrics for delivery to control processing system 131.

Control processing system 131 compares the first performance metrics with the third performance metrics to determine a user notice related to session quality on wireless communication network 122. Control processing system 131 transfers the user notice for delivery to wireless communication device 101.

Figure 4:
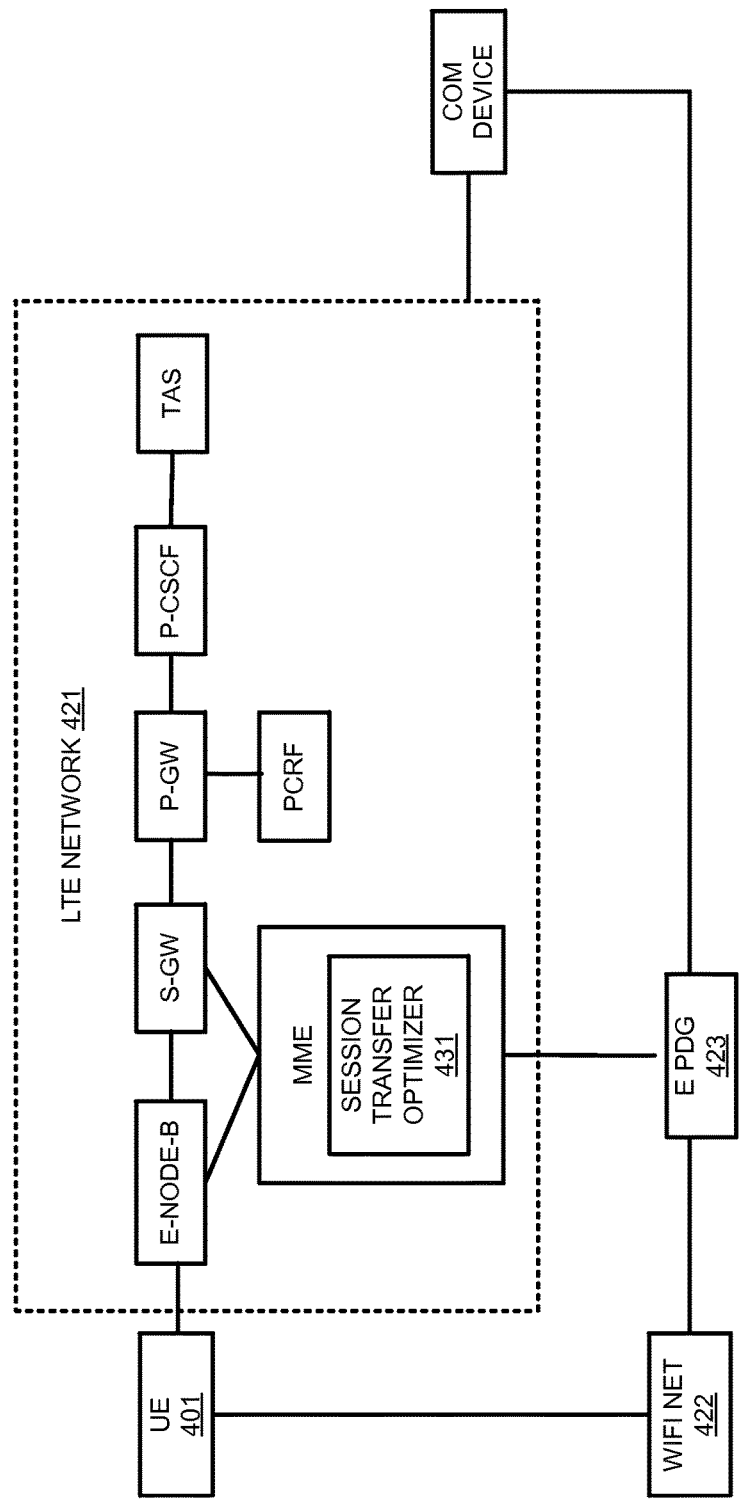
FIG. 4 illustrates a wireless communication system to optimize device performance across wireless communication networks.

FIG. 4 illustrates wireless communication system 400 to optimize device performance across wireless communication networks. Wireless communication system 400 is an example of wireless communication system 100, although wireless communication system 100 may use alternative configurations and operations. Wireless communication system 400 includes User Equipment (UE) 401, LTE network 421, WIFI network 422, and evolved Packet Data Gatway (ePDG) 423, and session transfer optimizer 431. LTE network 421 includes the eNodeB, Mobility Management Entity (MME)/session transfer optimizer 431, Serving Gateway (S-GW), PDN Gateway (P-GW), Policy and Charging Rules Function (PCRF), Proxy Call Session Control Function (P-CSCF), and Telephony Application Server (TAS). LTE network 422 may also include other components not shown here for clarity. Although shown as a single entity, MME and session transfer optimizer 431 may be located in a single device or distributed across multiple devices or systems.

LTE network 421 exchanges first wireless communications with UE 401 for a communication session. LTE network 421 determines first performance metrics for the communication session on LTE network 421. The communication session is transferred to WIFI network 422. After communication session transfer, WIFI network 422 exchanges second wireless communications with UE 401 for the communication session. WIFI network 422 determines second performance metrics for the communication session on WIFI network 422.

Session transfer optimizer 431 compares the first performance metrics with the second performance metrics to determine configuration instructions for WIFI network 422. Session transfer optimizer 431 transfers the configuration instructions for delivery to WIFI network 422. WIFI network 422 receives the configuration instructions and responsively modifies a network configuration.

WIFI network 422 exchanges third wireless communications with UE 401 for the communication session and determines third performance metrics for the communication session on WIFI network 422. Session transfer optimizer 431 compares the first performance metrics with the third performance metrics to determine a user notice related to session quality on WIFI network 422. Session transfer optimizer 431 transfers the user notice for delivery to UE 401.

Figure 5:
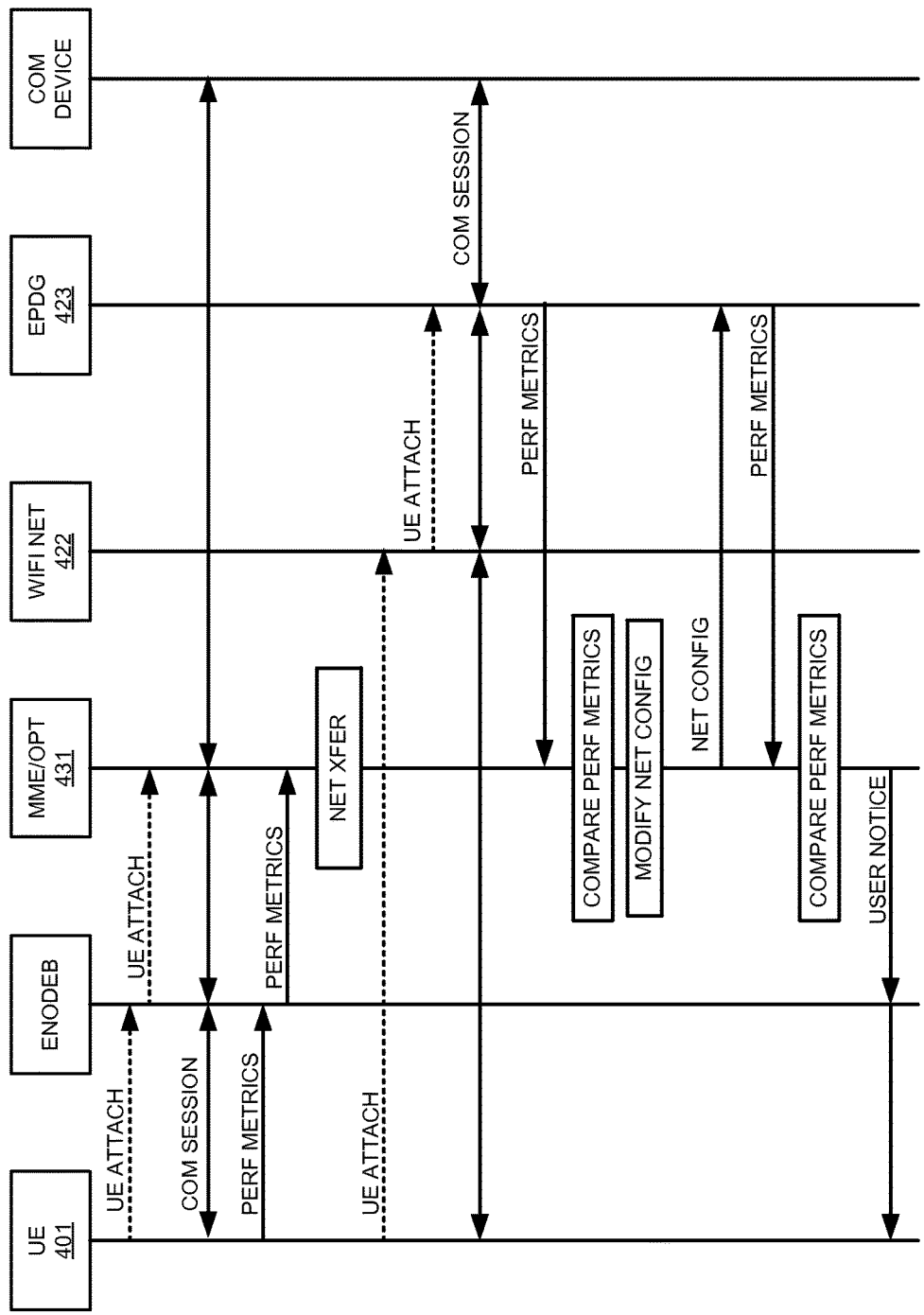
FIG. 5 illustrates the operation of the wireless communication system to optimize device performance across wireless communication networks.

FIG. 5 illustrates the operation of wireless communication system 400 to optimize device performance across LTE network 421 and WIFI network 422. In operation, UE 401 attaches to eNodeB in LTE network 421. UE 401 attaches to MME/Session transfer optimizer 431. UE 401 communicates with communication device over LTE network 421 through eNodeB and MME/session transfer optimizer 431. UE 401 exchanges first wireless communications with LTE network 421 for a communication session. LTE network 421 determines first performance metrics for the communication session on LTE network 421. LTE network 421 transfers the first performance metrics for delivery to session transfer optimizer 431. The communication session is transferred to WIFI network 422.

UE 401 attaches to WIFI network 422 and ePDG 423. WIFI network 422 exchanges second wireless communications with UE 401 for the communication session. WIFI network 422 determines second performance metrics for the communication session on WIFI network 422. WIFI network 422 transfers the second performance metrics for delivery to MME/session transfer optimizer 431.

MME/session transfer optimizer 431 compares the first performance metrics with the second performance metrics to determine configuration instructions for WIFI network 422. MME/session transfer optimizer 431 transfers the configuration instructions to WIFI network 422. WIFI network 422 receives the configuration instructions and responsively modifies a network configuration.

WIFI network 422 exchanges third wireless communications with UE 401 for the communication session and determines third performance metrics for the communication session on WIFI network 422. WIFI network 422 transfers the third performance metrics to MME/session transfer optimizer 431. MME/session transfer optimizer 431 compares the first performance metrics with the third performance metrics to determine a user notice related to session quality on WIFI network 422. MME/session transfer optimizer 431 transfers the user notice for delivery to UE 401.

For example, UE 401 is communicating over LTE network 421. While the communication session is active, UE 401 transfers to WIFI network 422. MME/Session transfer optimizer 431 compares the performance metrics for the communication session (i.e. over LTE network 421 compared to WIFI network 422). MME/session transfer optimizer 431 determines that the level of performance over WIFI network 422 is lower than the level of performance over LTE network 421. For example, WIFI network 422 could be experiencing bad jitter compared to LTE network 421. Although, "lower" is used in this example, it is understood, that other measurements or qualifiers of quality may be used, such as, higher/lower, better/worse, adequate/inadequate, good/poor, etc.

In response, MME/session transfer optimizer 431 transfers an enlarge media buffer message (i.e. configuration instructions) to ePDG 423. ePDG 423 transfers the configuration instructions to WIFI network 422. WIFI network 422 enlarges media buffers to mitigate the bad jitter. MME/session transfer optimizer 431 takes another measurement of performance for the communication session. MME/session transfer optimizer 431 compares these performance metrics (i.e. after the media buffer is enlarged) with the performance metrics for the communication session over LTE network 421 and determines a user notice related to session quality on WIFI network 422. Session transfer optimizer 431 transfers the user notice for delivery to UE 401.

Figure 6:
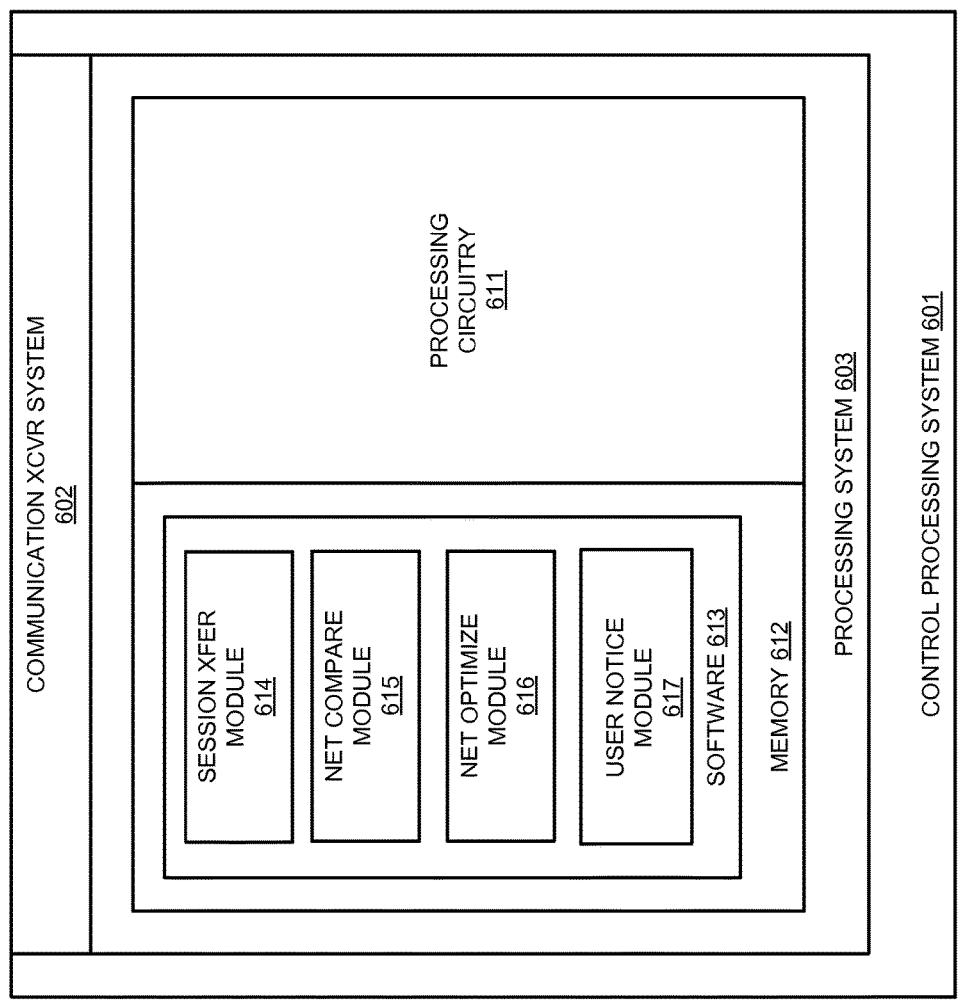
FIG. 6 illustrates an example of a control processing system to optimize device performance across wireless communication networks.

FIG. 6 illustrates control processing system 601. Control processing system 601 is an example of control processing system 131 and session transfer optimizer 431, although control processing system 131 and session transfer optimizer 431 may use alternative configurations. Control processing system 601 comprises communication transceiver system 602 and processing system 603. Processing system 603 is linked to communication transceiver system 602. Processing system 603 includes processing circuitry 611 and memory 612 that stores software 613. Software 613 comprises session transfer module 614, network compare module 615, network optimize module 616, and user notice module 617.

Communication transceiver system 602 comprises components that communicate over communication links, such as network cards, ports, RF transceivers, processing circuitry and software, or some other communication devices. Communication transceiver system 602 may be configured to communicate over metallic, wireless, or optical links. Communication transceiver 602 may be configured to use TDM, IP, Ethernet, optical networking, wireless protocols, communication signaling, or some other communication format—including combinations thereof.

Processing circuitry 611 comprises microprocessor and other circuitry that retrieves and executes operating software 613 from memory 612. Memory 612 comprises a non-transitory storage medium, such as a disk drive, flash drive, data storage circuitry, or some other memory apparatus. Operating software 613 comprises computer programs, firmware, or some other form of machine-readable processing instructions. Software 613 may include an operating system, utilities, drivers, network interfaces, applications, or some other type of software. When executed by circuitry 611, operating software 613 directs processing system 603 to operate control processing system 601 as described herein. In particular, operating software 613 directs processing system 603 to optimize device performance across wireless communication networks. Session transfer module 614 directs processing system 603 to transfer the communication session to a second wireless communication network. Network compare module 615 directs processing system 603 to compare performance metrics. Network optimize module 616 directs processing system 603 to determine and transfer configuration instructions. User notice module 617 directs processing system 603 to determine and transfer a user notice.

Figure 7:
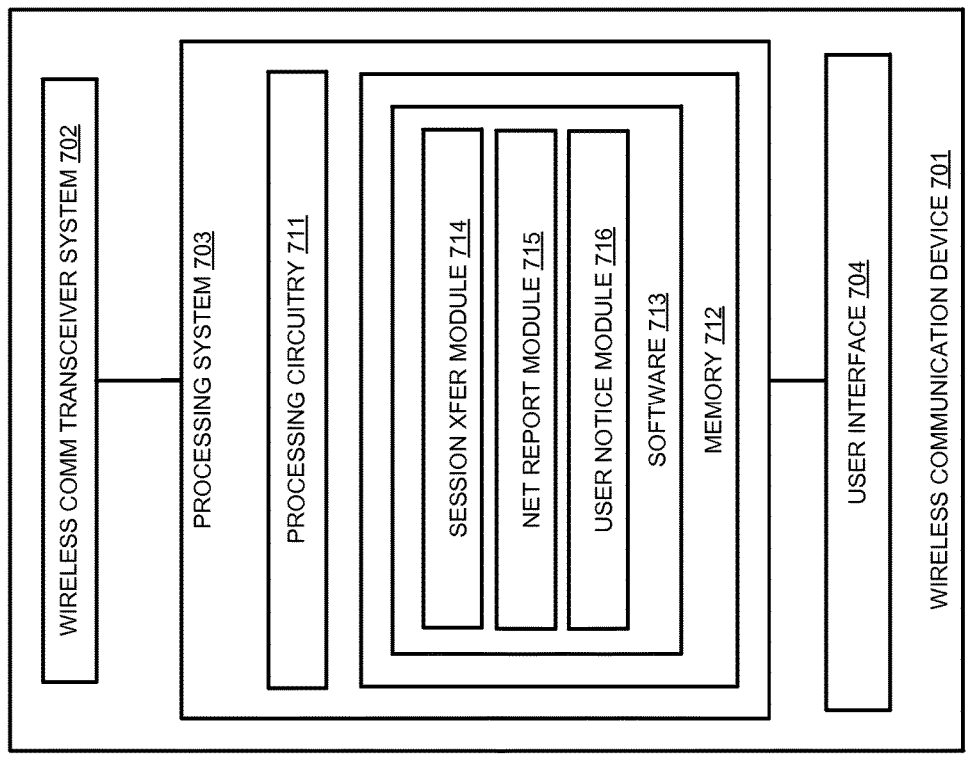
FIG. 7 illustrates an example of a wireless communication device.

FIG. 7 illustrates wireless communication device 701. Wireless communication device 701 is an example of wireless communication device 101 and UE 401, although wireless communication device 101 and UE 401 could use alternative configurations. Wireless communication device 701 comprises wireless communication transceiver system 702, processing system 703, and user interface 704. Processing system 703 is linked to wireless communication transceiver system 702 and user interface 704. Processing system 703 includes processing circuitry 711 and memory 712 that stores operating software 713. Software 713 comprises session transfer module 714, network report module 715, and user notice module 716.

Wireless communication device 701 may include other well-known components such as a battery and enclosure that are not shown for clarity. Wireless communication device 701 may be a telephone, cellular phone, mobile phone, smartphone, personal digital assistant (PDA), computer, laptop, tablet, e-book, mobile Internet appliance, media player, game console, wireless network interface card, or some other wireless communication apparatus—including combinations thereof.

Wireless communication transceiver system 702 comprises RF communication circuitry and an antenna. The RF communication circuitry typically includes an amplifier, filter, RF modulator, and signal processing circuitry. Wireless communication transceiver system 702 may also include a memory device, software, processing circuitry, or some other communication device. Wireless communication transceiver system 702 may use various communication formats, such as CDMA, EVDO, WIMAX, GSM, LTE, WIFI, HSPA, or some other wireless communication format—including combinations thereof.

User interface 704 comprises components that interact with a user to receive user inputs and to present media and/or information. User interface 704 may include a speaker, microphone, buttons, lights, display screen, touch screen, touch pad, scroll wheel, communication port, or some other user input/output apparatus—including combinations thereof. User interface 704 may be omitted in some examples.

Processing circuitry 711 comprises microprocessor and other circuitry that retrieves and executes operating software 713 from memory 712. Memory 712 comprises a non-transitory storage medium, such as a disk drive, flash drive, data storage circuitry, or some other memory apparatus. Processing circuitry 711 is typically mounted on a circuit board that may also hold memory 712, portions of wireless communication transceiver system 702, and user interface 704. Operating software 713 comprises computer programs, firmware, or some other form of machine-readable processing instructions. Operating software 713 may include an operating system, utilities, drivers, network interfaces, applications, or some other type of software.

When executed, software 713 directs processing system 703 to operate as described herein to optimize device performance across wireless communication networks. In particular, session transfer module 714 directs processing system 703 to transfer the communication session to a second wireless communication network. Network report module 715 directs processing system 703 to report performances metrics to a control processing system. User notice module 716 directs processing system 703 to generate a screen display indicating the comparative quality, between the first wireless communication network and the second wireless communication network, for the communication session.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless communication networks 121-122 comprise network elements that provide communications services to wireless device 101. Wireless communication networks 121-122 may comprise switches, wireless access nodes, Internet routers, network gateways, application servers, computer systems, communication links, or some other type of communication equipment—including combinations thereof.

Control processing system 131 comprises a computer system and communication interface. Control processing system 131 may also include other components such as a router, server, data storage system, and power supply. Control processing system 131 may reside in a single device, or may be distributed across multiple devices. Control processing system 131 is shown external to wireless communication networks 121 and 122, but control processing system 131 could be integrated within the components of wireless communication networks 121 and 122. Control processing system 131 could be located in the IMS, MME, P-GW, PCRF, ePDG, or in other systems or devices of wireless communication networks 121-122—including combinations thereof.

Wireless links 111-114 use the air or space as the transport media. Wireless links 111-114 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Wireless links 111-114 could be a direct link or may include intermediate networks, systems, or devices. Communication links 115-116 use metal, glass, air, space, or some other material as the transport media. Communication links 115-116 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 115-116 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
   in a first wireless communication network, exchanging first wireless communications with a wireless communication device for a communication session and determining first performance metrics for the communication session on the first wireless communication network;
   transferring the communication session from the first wireless communication network to a second wireless communication network;
   in the second wireless communication network after the communication session transfer, exchanging second wireless communications with the wireless communication device for the communication session and determining second performance metrics for the communication session on the second wireless communication network;
   in a control processing system, performing a comparison of the first performance metrics with the second performance metrics, and if the comparison indicates a lower Quality of Service (QoS) for the communication session on the second wireless communication network compared to the first wireless communication network, then determining configuration instructions to improve the QoS for the communication session on the second wireless communication network and transferring the configuration instructions for delivery to the second wireless communication network;
   in the second wireless communication network, receiving the configuration instructions and responsively modifying a network configuration, exchanging third wireless communications with the wireless communication device for the communication session and determining third performance metrics for the communication session on the second wireless communication network; and
   in the control processing system, comparing the first performance metrics with the third performance metrics to determine a user notice related to session quality on the second wireless communication network and transferring the user notice for delivery to the wireless communication device.

2. The method of claim 1 wherein the first wireless communication network comprises a Long Term Evolution (LTE) network and the second wireless communication network comprises a Wireless Fidelity (WIFI) network.

3. The method of claim 1 wherein the first wireless communication network comprises a Long Term Evolution (LTE) network and the second wireless communication network comprises a High Speed Packet Access (HSPA) network.

4. The method of claim 1 wherein the first wireless communication network comprises a Long Term Evolution (LTE) network and the second wireless communication network comprises a High Rate Packet Data (HRPD) network.

5. The method of claim 1 wherein the first, second, and third performance metrics comprise at least one of packet loss, jitter, Signal to Noise Ratio (SNR), or interference.

6. The method of claim 1 wherein the communication session comprises a Voice over Long Term Evolution (VoLTE) session.

7. The method of claim 1 wherein the user notice comprises a screen display indicating comparative quality for the communication session and indicates a comparable Quality of Service (QoS) between the first wireless communication network and the second wireless communication network.

8. The method of claim 1 wherein the user notice comprises a screen display indicating comparative quality for the communication session and indicates a higher Quality of Service (QoS) on the second wireless communication network.

9. The method of claim 1 wherein the user notice comprises a screen display indicating comparative quality for the communication session and indicates a lower Quality of Service (QoS) on the second wireless communication network.

10. The method of claim 1 wherein the user notice comprises a screen display indicating comparative quality for the communication session and indicates a lower but adequate Quality of Service (QoS) on the second wireless communication network.

11. A communication system comprising:
    a first wireless communication network configured to exchange first wireless communications with a wireless communication device for a communication session and determine first performance metrics for the communication session on the first wireless communication network and transfer the communication session from the first wireless communication network to a second wireless communication network;
    the second wireless communication network configured to exchange second wireless communications with the wireless communication device for the communication session and determine second performance metrics for the communication session on the second wireless communication network;

a control processing system configured to perform a comparison of the first performance metrics with the second performance metrics, and if the comparison indicates a lower Quality of Service (QoS) for the communication session on the second wireless communication network compared to the first wireless communication network, then the control process system configured to determine configuration instructions to improve the QoS for the communication session on the second wireless communication network and transfer the configuration instructions for delivery to the second wireless communication network;

the second wireless communication network configured to receive the configuration instructions and responsively modify a network configuration, exchange third wireless communications with the wireless communication device for the communication session, and determine third performance metrics for the communication session on the second wireless communication network; and the control processing system configured to compare the first performance metrics with the third performance metrics to determine a user notice related to session quality on the second wireless communication network and transfer the user notice for delivery to the wireless communication device.

12. The communication system of claim 11 wherein the first wireless communication network comprises a Long Term Evolution (LTE) network and the second wireless communication network comprises a Wireless Fidelity (WIFI) network.

13. The communication system of claim 11 wherein the first wireless communication network comprises a Long Term Evolution (LTE) network and the second wireless communication network comprises a High Speed Packet Access (HSPA) network.

14. The communication system of claim 11 wherein the first wireless communication network comprises a Long Term Evolution (LTE) network and the second wireless communication network comprises a High Rate Packet Data (HRPD) network.

15. The communication system of claim 11 wherein the first, second, and third performance metrics comprise at least one of packet loss, jitter, Signal to Noise Ratio (SNR), or interference.

16. The communication system of claim 11 wherein the communication session comprises a Voice over Long Term Evolution (VoLTE) session.

17. The communication system of claim 11 wherein the user notice comprises a screen display indicating comparative quality for the communication session and indicates a comparable Quality of Service (QoS) between the first wireless communication network and the second wireless communication network.

18. The communication system of claim 11 wherein the user notice comprises a screen display indicating comparative quality for the communication session and indicates a higher Quality of Service (QoS) on the second wireless communication network.

19. The communication system of claim 11 wherein the user notice comprises a screen display indicating comparative quality for the communication session and indicates a lower Quality of Service (QoS) on the second wireless communication network.

20. The communication system of claim 11 wherein the user notice comprises a screen display indicating comparative quality for the communication session and indicates a lower but adequate Quality of Service (QoS) on the second wireless communication network.

* * * * *